(12) United States Patent
Cho et al.

(10) Patent No.: US 12,406,808 B2
(45) Date of Patent: Sep. 2, 2025

(54) ELECTRONIC COMPONENT

(71) Applicant: SAMSUNG ELECTRO-MECHANICS CO., LTD., Suwon-si (KR)

(72) Inventors: BeomJoon Cho, Suwon-si (KR); Seungmin Ahn, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 78 days.

(21) Appl. No.: 17/979,971

(22) Filed: Nov. 3, 2022

(65) Prior Publication Data

US 2023/0187142 A1 Jun. 15, 2023

(30) Foreign Application Priority Data

Dec. 9, 2021 (KR) .................. 10-2021-0175682

(51) Int. Cl.
| | | |
|---|---|---|
| *H01G 4/30* | (2006.01) | |
| *H01G 4/008* | (2006.01) | |
| *H01G 4/012* | (2006.01) | |
| *H01G 4/12* | (2006.01) | |
| *H01G 4/232* | (2006.01) | |
| *H01G 4/248* | (2006.01) | |

(52) U.S. Cl.
CPC ............ *H01G 4/30* (2013.01); *H01G 4/008* (2013.01); *H01G 4/012* (2013.01); *H01G 4/12* (2013.01); *H01G 4/2325* (2013.01); *H01G 4/248* (2013.01)

(58) Field of Classification Search
CPC .......... H01G 4/30; H01G 4/008; H01G 4/012; H01G 4/12; H01G 4/2325; H01G 4/248
See application file for complete search history.

(56) References Cited

U.S. PATENT DOCUMENTS

| | | | |
|---|---|---|---|
| 8,288,924 B2 | 10/2012 | Mizuno et al. | |
| 8,587,923 B2 | 11/2013 | Ogawa et al. | |
| 8,865,584 B2 | 10/2014 | Ohno | |
| 10,879,005 B2 | 12/2020 | Maki et al. | |
| 2014/0225152 A1* | 8/2014 | Asahi ................... | H05K 1/0296 174/262 |
| 2015/0036263 A1* | 2/2015 | Hill .......................... | H01G 2/06 361/301.4 |

(Continued)

FOREIGN PATENT DOCUMENTS

| | | |
|---|---|---|
| JP | 2002-164246 A | 6/2002 |
| JP | 6156345 B2 | 7/2017 |

(Continued)

OTHER PUBLICATIONS

Office Action dated Jun. 9, 2025, issued in corresponding Korean Patent Application No. 10-2021-0175682 with an English translation.

*Primary Examiner* — Michael P McFadden

(74) *Attorney, Agent, or Firm* — Morgan Lewis & Bockius LLP

(57) ABSTRACT

An electronic component according to an embodiment including a conductive bonding portion disposed between an external electrode and a frame terminal, and a non-conductive material layer disposed on a band portion of the external electrode. The external electrode may also have a connection portion covering one surface of a body of the electronic component.

22 Claims, 13 Drawing Sheets

(56) References Cited

U.S. PATENT DOCUMENTS

| | | | |
|---|---|---|---|
| 2015/0054388 A1* | 2/2015 | Itagaki | H10N 30/50 336/200 |
| 2016/0020033 A1* | 1/2016 | Shin | H01G 2/065 361/301.4 |
| 2016/0086730 A1* | 3/2016 | Park | H05K 3/3426 361/306.3 |
| 2016/0219739 A1* | 7/2016 | Park | H01G 4/30 |
| 2016/0343506 A1* | 11/2016 | Lee | H01G 4/232 |
| 2017/0186539 A1* | 6/2017 | Masuda | H01G 2/06 |
| 2017/0256359 A1* | 9/2017 | Masunari | H01G 4/005 |
| 2019/0122823 A1* | 4/2019 | Cho | H01G 4/38 |
| 2019/0131076 A1* | 5/2019 | Fukumura | H01G 4/232 |
| 2019/0385795 A1* | 12/2019 | Yang | H01G 4/30 |
| 2020/0075262 A1* | 3/2020 | Cho | H01G 4/38 |

FOREIGN PATENT DOCUMENTS

| | | |
|---|---|---|
| JP | 2019-220677 A | 12/2019 |
| JP | 2020-064982 A | 4/2020 |
| KR | 10-1141399 B1 | 5/2011 |
| KR | 10-1247228 B1 | 3/2013 |
| KR | 10-1343289 B1 | 12/2013 |
| KR | 10-2019-0121156 A | 10/2019 |
| WO | 2013/069232 A1 | 5/2013 |

\* cited by examiner

ELECTRONIC COMPONENT

CROSS-REFERENCE TO RELATED APPLICATION

This application claims priority to and the benefit of Korean Patent Application No. 10-2021-0175682 filed in the Korean Intellectual Property Office on Dec. 9, 2021, the entire contents of which are incorporated herein by reference.

TECHNICAL FIELD

The present disclosure relates to an electronic component, and more particularly, to a multilayer ceramic capacitor.

BACKGROUND

Electronic components may be down-sized and realize high capacity and thus are used in various electronic devices. Particularly, the electronic components are essentially used for the latest IT devices due to high frequency characteristics and excellent heat resistance.

Recently, with the rapid rise of environmentally friendly and electric vehicles, as electric power driving systems in automobiles are increasing, the demand for the electronic components such as multilayer capacitors required for the automobiles is increasing.

Since automobile parts are required to have high heat resistance and electrical reliability, the electronic components are also required to have more advanced performance.

Accordingly, there is an increasing demand for electronic components capable of realizing high capacity in a limited space or having excellent durability against vibration and deformation.

However, since the conventional electronic components are mounted directly on a board, heat or deformation generated from the board is directly transmitted to the electronic components, failing in securing reliability. Accordingly, a method of protecting the electronic components by bonding a metal frame at the sides thereof to secure a distance between electronic components and board and thus absorb the heat or deformation by the metal is suggested.

However, as a flux component included in a solder used for bonding the metal frame with the electronic components may dissolve a glass component of the electronic components and thus make a moisture-penetrating path, there is a problem of deteriorating moisture resistance and insulation resistance and shortening a life-span of the components.

SUMMARY

An embodiment provides an electronic component capable of suppressing deterioration, defects, and deterioration of reliability.

According to an embodiment, an electronic component includes: a multilayer capacitor including a capacitor body including a dielectric layer and an internal electrode and an external electrode having a connection portion covering one surface of the capacitor body and a band portion covering an edge of the capacitor body; a frame terminal disposed outside the connection portion; a conductive bonding portion disposed between the external electrode and the frame terminal; and a non-conductive material layer disposed on the band portion.

The capacitor body may include a plurality of dielectric layers and a plurality of first and second internal electrodes alternately disposed with the dielectric layer interposed therebetween.

The capacitor body may include first and second surfaces facing each other, third and fourth surfaces connected to the first and second surfaces and facing each other, and one end of each of the first and second internal electrodes may extend from the third and fourth surfaces, respectively.

The connection portion may be respectively disposed on the third and fourth surfaces of the capacitor body to be connected to the first and second internal electrodes.

The band portion may be disposed at edges where the first and second surfaces and the third and fourth surfaces of the capacitor body meet.

The band portion may extend from the connection portion to portions of the first and second surfaces of the capacitor body.

The non-conductive material layer may extend onto an edge between the connection portion and the band portion.

The non-conductive material layer may extend to a portion on the connection portion.

The non-conductive material layer may be disposed on the upper, lower left, right side, or a combination thereof of the conductive bonding portion.

The non-conductive material layer may surround an outer periphery of the conductive bonding portion.

The conductive bonding portion may be disposed in a central area excluding edges of the connection portion.

The non-conductive material layer may extend to a portion on the first and second surfaces of the capacitor body.

An average thickness of the non-conductive material layer disposed on the band portion may be thicker than an average thickness of the conductive bonding portion disposed on the band portion.

The conductive bonding portion may include a solder or a conductive resin paste.

The non-conductive material layer may include a photo solder resist (PSR), an anti-flux diffusion inhibitor (anti-flux migration composition), polytetrafluoroethylene, borax ($Na_2[B_4O_5(OH)_4] \cdot 8H_2O$), or a combination thereof.

The non-conductive material layer may further include a metal powder including Cr, Ti, Ta, Mg, or a combination thereof.

The conductive bonding portion may be disposed on an outermost surface of the connection portion.

The non-conductive material layer may be disposed on an outermost surface of the band portion.

The non-conductive material layer may be disposed on the band portion at the edges where the first and second surfaces and the third and fourth surfaces of the capacitor body meet.

An electronic component according to another embodiment includes: first and second multilayer capacitors each including a capacitor body including a dielectric layer and an internal electrode, and an external electrode having connection portions covering one surface of the capacitor body and a band portion covering an edge of the capacitor body; a frame terminal disposed outside the connection portions; conductive bonding portions disposed between the external electrodes and the frame terminal; and a first non-conductive material layer disposed on the band portion.

The electronic component may further include a second non-conductive material layer disposed between the conductive bonding portions.

The second non-conductive material layer may be disposed on a surface facing the multilayer capacitors of the frame terminal.

The second non-conductive material layer may have a stripe shape crossing between the conductive bonding portions, a plurality of stripe shapes, a curved stripe shape inclined downward from the central portion toward both ends, or a concave stripe shape in which a center portion has a narrower width and a wider width toward the end portions.

The second non-conductive material layer may extend to surround an outer periphery portion of each of the plurality of conductive bonding portions.

The second non-conductive material layer may extend to a whole surface of the frame terminal except for the plurality of conductive bonding portions.

An average width of the second non-conductive material layer may be about 2% to about 20% relative to an average thickness of the capacitor body.

An average width of the second non-conductive material layer may be more than 2% to about 20% relative to an average thickness of the capacitor body.

In the electronic component according to the embodiments, a multilayer capacitor is bonded to a metal frame to improve resistance to bending strength, deformation, acoustic noise, and the like and a flux component is prevented from penetrating toward an external electrode, a ceramic boundary, and a capacitor body, when the multilayer capacitor and the metal frame are bonded by a solder, so that the flux component may be prevented from penetrating toward the external electrode, thereby suppressing deterioration of electronic components, defects, and deterioration of reliability. In addition, it is possible to prevent damage to the metal frame and prevent the solder from flowing down, thereby stably bonding the electronic component to the metal frame.

DETAILED DESCRIPTION

Figure 1:
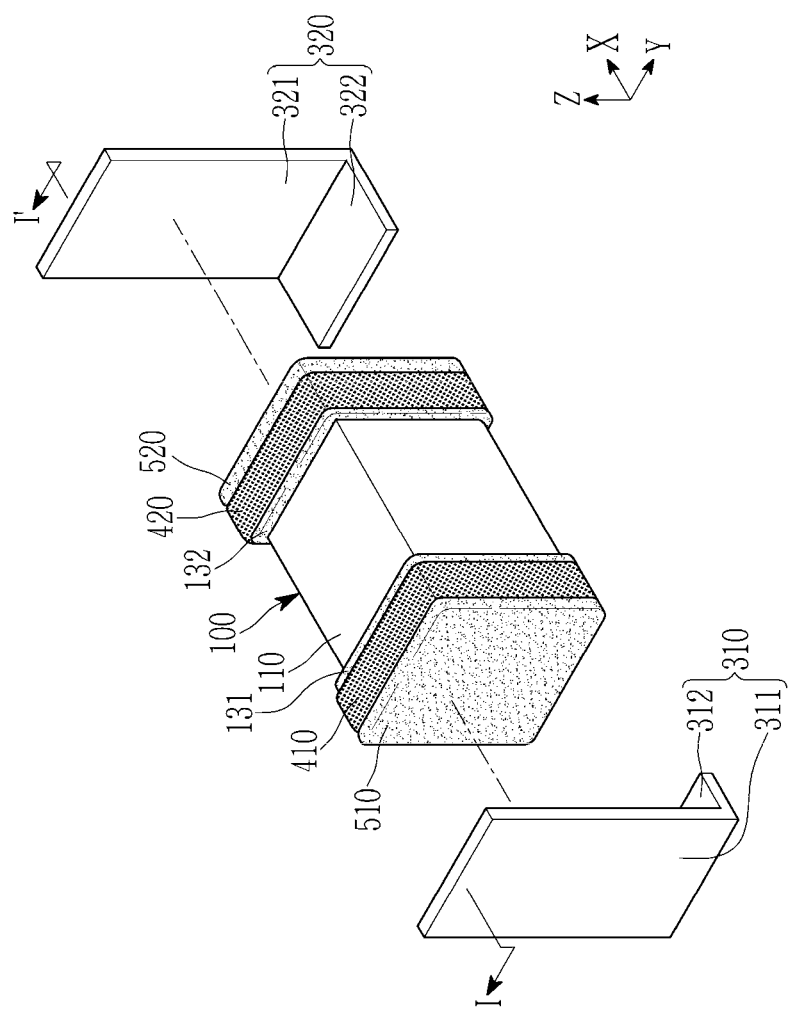
FIG. 1 is a partially exploded perspective view illustrating an electronic component according to an embodiment.

The present disclosure will be described more fully hereinafter with reference to the accompanying drawings, in which embodiments of the disclosure are shown. The drawings and description are to be regarded as illustrative in nature and not restrictive. Like reference numerals designate like elements throughout the specification. Further, the accompanying drawings are provided only in order to allow embodiments disclosed in the present specification to be easily understood, and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various constituent elements, and are not to be interpreted as limiting these constituent elements. The terms are only used to differentiate one constituent element from other constituent elements.

It is to be understood that when one constituent element is referred to as being "connected" or "coupled" to another constituent element, it may be connected or coupled directly to the other constituent element or may be connected or coupled to the other constituent element with a further constituent element intervening therebetween. In contrast, it should be understood that, when it is described that an element is "directly coupled" or "directly connected" to another element, no element is present between the element and the other element.

Throughout the specification, it should be understood that the term "include", "comprise", "have", or "configure" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance. Unless explicitly described to the contrary, the word "comprise" and variations such as "comprises" or "comprising" will be understood to imply the inclusion of stated elements but not the exclusion of any other elements.

Figure 2:
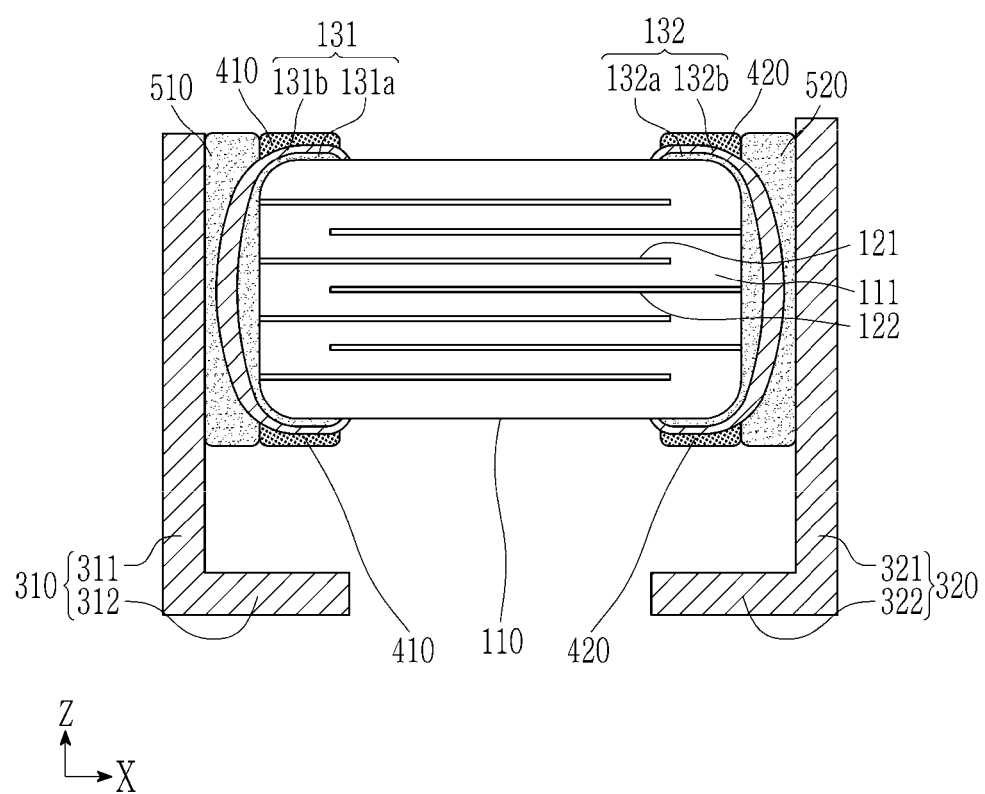
FIG. 2 is a cross-sectional view of the electronic component taken along line I-I' of FIG. 1.
Figure 3:
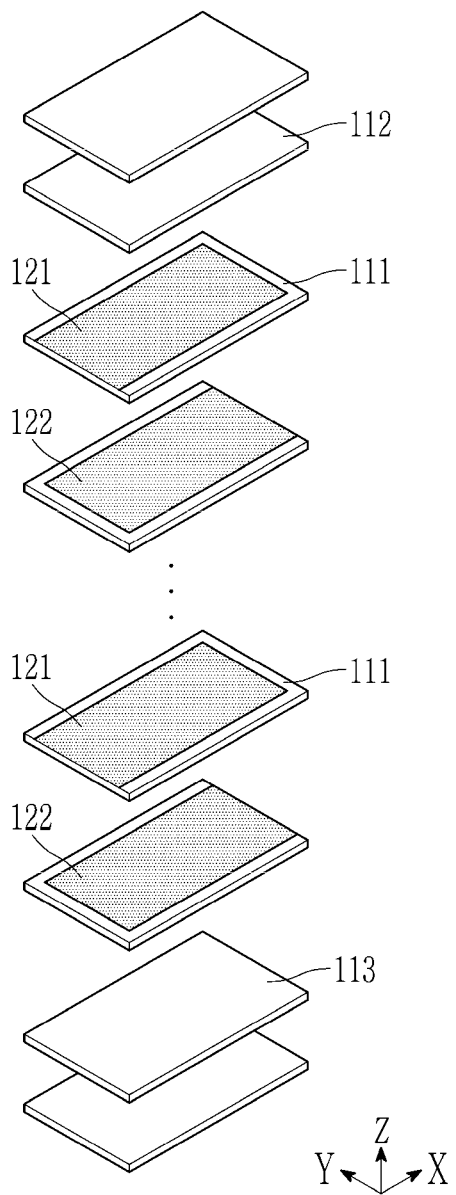
FIG. 3 is an exploded perspective view illustrating a stacked structure of internal electrodes in the multilayer capacitor of FIG. 1.
Figure 4:
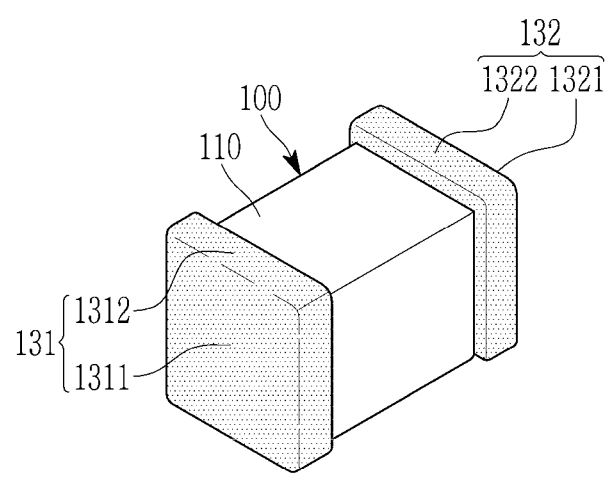
FIG. 4 is a perspective view illustrating the multilayer capacitor of FIG. 1.

FIG. 1 is a partially exploded perspective view illustrating an electronic component according to an embodiment, FIG. 2 is a cross-sectional view of the electronic component taken along line I-I' of FIG. 1, FIG. 3 is an exploded perspective view illustrating a stacked structure of internal electrodes in the multilayer capacitor of FIG. 1, and FIG. 4 is a perspective view illustrating the multilayer capacitor of FIG. 1.

In order to clearly describe an embodiment, X, Y, and Z directions in the drawings are respectively defined as a length direction, a width direction, and a thickness direction of a capacitor body 110. Herein, the Z direction, the thickness direction, may be used in the same concept as a stacking direction in which dielectric layers 111 are stacked. The X direction may be defined as an approximately perpendicular direction to the Z direction, and the Y direction may be defined as an approximately vertical direction with respect to the Z direction.

Referring to FIGS. 1 to 4, an electronic component according to an embodiment includes first and second frame terminals 310 and 320, a multilayer capacitor 100, first and second conductive bonding portions 510 and 520, and first and second non-conductive material layers 410 and 420.

The first frame terminal 310 includes a first supporting portion 311 extending in the Z direction, and a first mounting portion 312 extending in the X direction from a lower end of the first supporting portion 311.

The second frame terminal 320 includes a second supporting portion 321 facing the first supporting portion 311 and extending in the Z direction, and a second mounting portion 322 extending in the X direction from the lower end of the second supporting portion 321.

According to this structure, the first and second frame terminals 310 and 320 may have a substantially 'L' shape, and each end of the first and second frame terminals 310 and 320 may be disposed to face each other in the X direction.

The first and second supporting portions 311 and 321 of the first and second frame terminals 310 and 320 are connected to the first and second external electrodes 131 and 132, and the first and second mounting portions 312 and 322 may be fixed to a board (not shown).

The multilayer capacitor 100 is disposed between the first and second supporting portions 311 and 321.

The multilayer capacitor 100 includes the capacitor body 110 and first and second external electrodes 131 and 132 disposed at both ends of the capacitor body 110 which face each other in the X direction.

The capacitor body 110 is formed by stacking a plurality of the dielectric layers 111 in the Z direction and then firing them, and includes the plurality of dielectric layers 111 and a plurality of first and second internal electrodes 121 and 122 alternately interposed therebetween in the Z direction.

In addition, as needed, covers 112 and 113 having a predetermined thickness may be formed at both ends of the capacitor body 110 in the Z direction.

Herein, each dielectric layer 111 adjacent to the capacitor body 110 may be integrated closely to distinguish boundaries.

For example, this capacitor body 110 may have a substantially hexahedral shape.

For better understanding and ease of description, both surfaces of the capacitor body 110 facing each other in the Z direction are defined as first and second surfaces, both surfaces thereof facing each other in the X direction and connected to the first and second surfaces are defined as third and fourth surfaces, and both surfaces connected to the first and second surfaces and also to the third and fourth surfaces and facing each other in the Y direction are defined as fifth and sixth surfaces. For example, the first surface, which is a bottom surface, may be a surface facing a mounting board.

For example, the dielectric layer 111 may include a ceramic material with a high dielectric constant. For example, the ceramic material may include a dielectric material ceramic including a component such as $BaTiO_3$, $CaTiO_3$, $SrTiO_3$, $CaZrO_3$, or the like. In addition, in addition to these components, auxiliary components such as a Mn compound, an Fe compound, a Cr compound, a Co compound, a Ni compound, and the like may be further included.

For example, $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like in which Ca and Zr are partially dissolved in a $BaTiO_3$-based dielectric material ceramic may be included.

In addition, in the dielectric layer 111, a ceramic additive, an organic solvent, a plasticizer, a binder, a dispersing agent, and the like along with the ceramic powder may be further added. The ceramic additive may be, for example, a transition metal oxide or a transition metal carbide, a rare earth element, magnesium (Mg), aluminum (Al), or the like.

For example, the dielectric layer 111 may have an average thickness of about 0.5 μm to about 10 μm.

The first and second internal electrodes 121 and 122 are electrodes having different polarities, are alternately disposed to face each other in the Z direction with the dielectric layer 111 in the middle, and one ends thereof may be exposed through (or extend from) the third and fourth surfaces of the capacitor body 110.

The first and second internal electrodes 121 and 122 may be electrically insulated by the dielectric layer 111 disposed in the middle.

The ends of the first and second internal electrodes 121 and 122 alternately exposed through the third and fourth surfaces of the capacitor body 110 may be electrically connected respectively to the first and second external electrodes 131 and 132.

The first and second internal electrodes 121 and 122 may include a conductive metal, for example, a metal such as Ni, Cu, Ag, Pd, Au, and the like or an alloy thereof, for example, a Ag—Pd alloy.

For example, the first and second internal electrodes 121 and 122 may include dielectric material particles having the same composition as the ceramic material included in the dielectric layer 111.

For example, the first and second internal electrodes 121 and 122 may have an average thickness of about 0.1 μm to about 2 μm.

According to the above configuration, when a predetermined voltage is applied to the first and second external electrodes 131 and 132, charges are accumulated between the first and second internal electrodes 121 and 122. Herein, capacitance of the multilayer capacitor 100 is proportional to an overlapped area of the first and second internal electrodes 121 and 122 overlapped along the Z direction.

The first and second external electrodes 131 and 132 may be provided with voltages having different polarities and electrically connected to the exposed portions of the first and second internal electrodes 121 and 122, respectively.

The first and second external electrodes 131 and 132 may respectively include first and second connection portions 1311 and 1321 disposed on the third and fourth surfaces of the capacitor body 110 and respectively connected to the first and second internal electrodes 121 and 122, and also, first and second band portions 1312 and 1322 disposed at the edges where the first and second surfaces of the capacitor body 110 meet the third and fourth surfaces thereof.

The first and second band portions 1312 and 1322 may extend from the first and second connection portions 1311 and 1321 to portions of the first and second surfaces of the capacitor body 110, respectively. The first and second band portions 1312 and 1322 may respectively further extend from the first and second connection portions 1311 and 1321 to the portions of the fifth and sixth surfaces of the capacitor body 110.

The first and second external electrodes 131 and 132 may respectively include first and second base electrodes 131a and 132a and also first and second terminal electrodes 131b and 132b respectively covering the first and second base electrodes 131a and 132a.

The first and second base electrodes 131a and 132a may include copper (Cu). Alternatively, the first and second base electrodes 131a and 132a may include a conductive paste including copper (Cu) as a main component, one or more materials of nickel (Ni), tin (Sn), palladium (Pd), platinum (Pt), gold (Au), silver (Ag), tungsten (W), titanium (Ti), lead (Pb), or an alloy thereof, and glass. For example, the first and second base electrodes 131a and 132a may be formed in a method of dipping the capacitor body 110 in a conductive paste including a conductive metal and glass, printing the conductive paste on the surface of the capacitor body 110 through screen printing, gravure printing, or the like, coating the conductive paste on the surface of the capacitor body 110, or transferring a dry film formed by drying the conductive paste onto the capacitor body 110.

The first base electrode 131a and the second base electrode 132a are formed of the above conductive paste and thus may increase density of the first and second external electrodes 131 and 132 due to the glass added thereto as well as maintain sufficient conductivity and thereby effectively suppress penetration of a plating solution and/or external moisture.

For example, the glass component included in the first base electrode 131a and the second base electrode 132a may have a composition in which oxides are mixed and the metal oxides may be one or more selected from a silicon oxide, a boron oxide, an aluminum oxide, a transition metal oxide, an alkali metal oxide, and an alkali earth metal oxide. The transition metal may be selected from zinc (Zn), titanium (Ti), copper (Cu), vanadium (V), manganese (Mn), iron (Fe), and nickel (Ni), the alkali metal may be at least one selected from lithium (Li), sodium (Na), and potassium (K), and the alkaline earth metal may be at least one selected from magnesium (Mg), calcium (Ca), strontium (Sr), and barium (Ba).

For example, the first and second terminal electrodes 131b and 132b may be formed by plating. The first and second terminal electrodes 131b and 132b may be formed by sputtering or electroplating (electric deposition).

For example, the first and second terminal electrodes 131b and 132b may include nickel (Ni) as a main component, and may further include nickel (Ni), copper (Cu), tin (Sn), palladium (Pd), platinum (Pt), gold (Au), silver (Ag), tungsten (W), titanium (Ti), or lead (Pb) alone or an alloy thereof. The first and second terminal electrodes 131b and 132b may improve mountability of the multilayer capacitor 100 on a board, structural reliability, external durability, heat resistance, and equivalent series resistance (ESR).

The first and second external electrodes 131 and 132 respectively are electrically connected to the first and second frame terminals 310 and 320. For this connection, the electronic component includes first and second conductive bonding portions 510 and 520.

The first and second conductive bonding portions 510 and 520 are respectively disposed between the first and second external electrodes 131 and 132 and the first and second frame terminals 310 and 320.

For example, the first and second conductive bonding portions 510 and 520 may include a solder or a conductive adhesive such as a conductive resin paste and the like.

For example, the solder may be Sn—Sb-based, Sn—Ag—Cu-based, Sn—Cu-based, Sn—Bi-based, or the like, wherein the Sn—Sb-based solder may include Sb in amount of greater than or equal to about 5% and less than or equal to about 15%.

Herein, a flux component included in the solder may dissolve a glass component of the multilayer capacitor 100 and thus make a moisture penetration path, and thereby deteriorate moisture resistance reliability.

In order to solve this problem, the first non-conductive material layer 410 is disposed on the first band portion 1312 and the second non-conductive material layer 420 is disposed on the second band portion 1322.

The first and second non-conductive material layers 410 and 420 may be disposed on portions of the first and second band portions 1312 and 1322, or may be disposed on the whole surfaces of the first and second band portions 1312 and 1322. For example, in FIG. 1, the first and second non-conductive material layers 410 and 420 are disposed on all four surfaces of the first and second band portions 1312 and 1322 but may be disposed only on any one of the first, second, or third surface out of all the four surfaces of the first and second non-conductive material layers 410 and 420. For example, the first and second non-conductive material layers 410 and 420 may be respectively disposed on the first and second band portions 1312 and 1322 on the first, second, fifth, or sixth surface of the capacitor body 110 or surround the first and second band portions 1312 and 1322 on the first, second, fifth, or sixth surface of the capacitor body 110 in the Y direction and the Z direction.

When the multilayer capacitor 100 is bonded with the first and second frame terminals 310 and 320 by a solder, the first and second non-conductive material layers 410 and 420 may prevent a flux component from penetrating toward the first and second external electrodes 131 and 132 and the capacitor body 110.

For example, any non-conductive material capable of preventing flux diffusion may be used for the first and second non-conductive material layers 410 and 420. For example, the first and second non-conductive material layers 410 and 420 may include a photo solder resist (PSR), an anti-flux diffusion inhibitor (anti-flux migration composition), polytetrafluoroethylene, borax ($Na_2[B_4O_5(OH)_4]\cdot 8H_2O$), or a combination thereof.

The photo solder resist (PSR) may be any photo solder resist used in the technical field of the present disclosure. The photo solder resist may be coated through an exposure process.

The anti-flux diffusion inhibitor may include, for example, an organic coating such as an unsaturated ester compound having at least one polyfluorinated alkyl group or (meth)acrylate having at least one silane to suppress solder and flux wetting.

Polytetrafluoroethylene ($(C_2F_4)_n$) or borax ($Na_2[B_4O_5(OH)_4]\cdot 8H_2O$) has an excellent effect of inhibiting contamination and flux spreading on the first and second non-conductive material layers 410 and 420.

For example, the first and second non-conductive material layers 410 and 420 may further include a metal coating layer including Cr, Ti, Ta, Mg, or a combination thereof. These metals have low wetting with solder, which can suppress wetting of solder and flux.

The first and second non-conductive material layers 410 and 420 may include a mixture of polytetrafluoroethylene or borax and a metal powder including Cr, Ti, Ta, Mg, or a combination thereof. In this case, the coefficients of thermal expansion of the first and second non-conductive material layers 410 and 420 may be adjusted to be close to the capacitor body 110 and the first and second external electrodes 131 and 132, so that deterioration of the first and second non-conductive material layers 410 and 420 may be suppressed.

Figure 5:
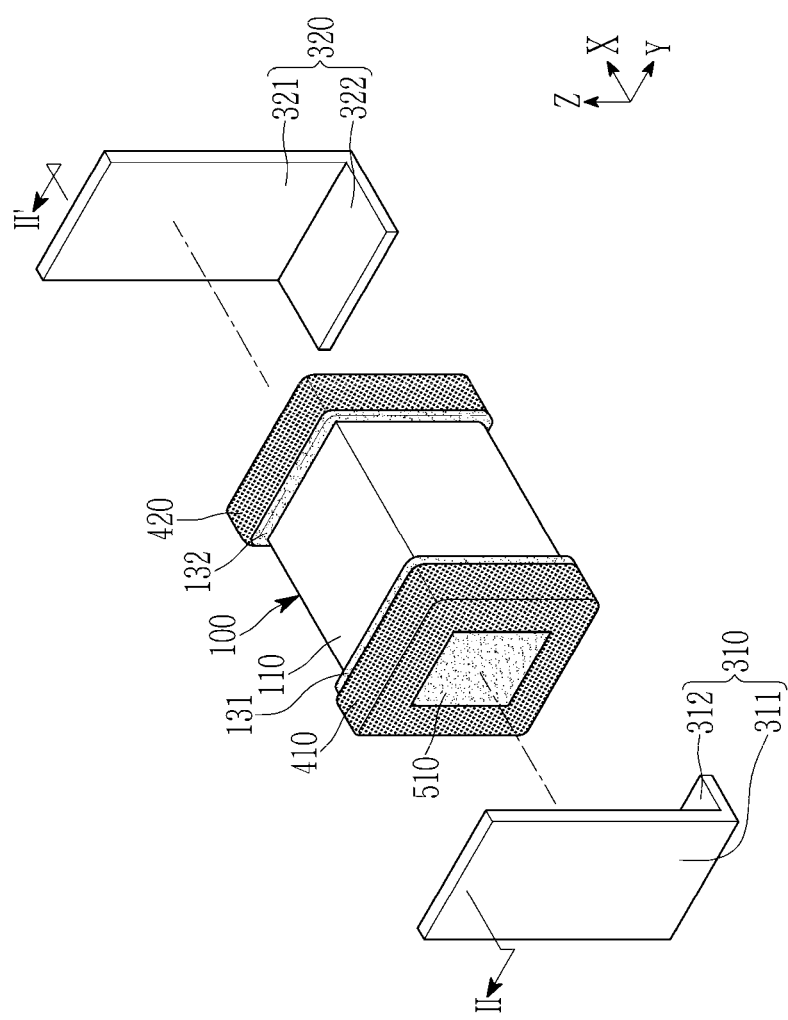
FIG. 5 is a partially exploded perspective view illustrating an electronic component according to another embodiment.
Figure 6:
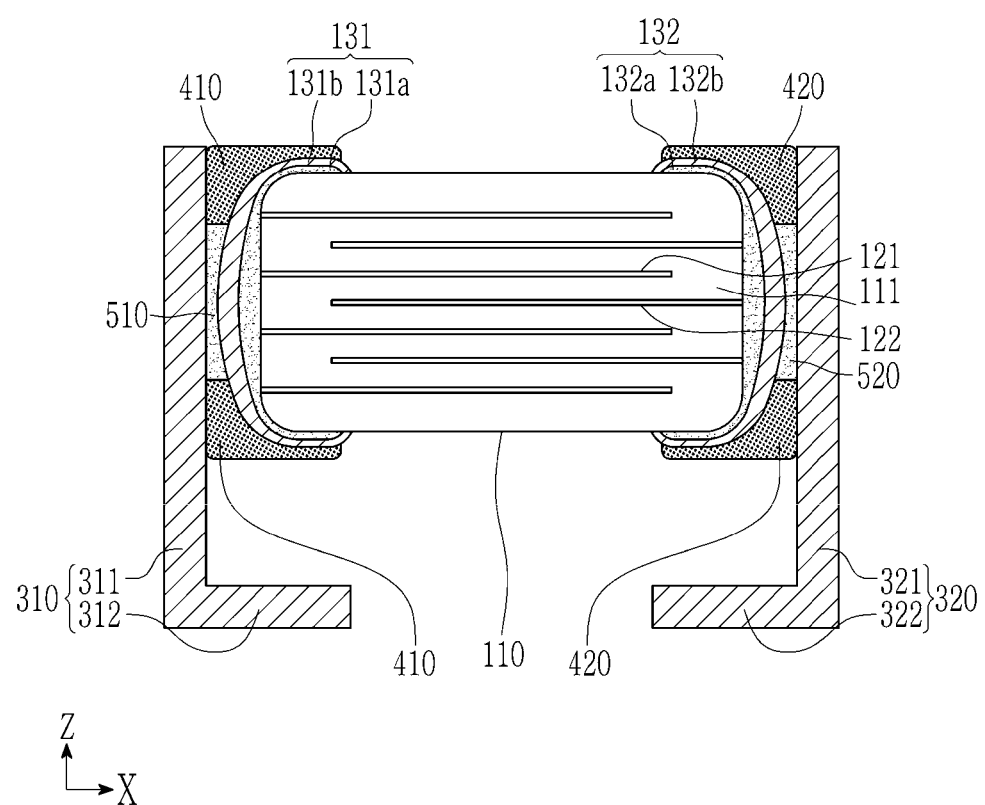
FIG. 6 is a cross-sectional view of the electronic component taken along line II-II' of FIG. 5.

FIG. 5 is a partially exploded perspective view illustrating an electronic component according to another embodiment, and FIG. 6 is a cross-sectional view of the electronic component taken along line II-II' of FIG. 5.

Since the electronic component according to the present embodiment is similar to the aforementioned electronic component, overlapping descriptions are omitted, and differences are mainly described.

In FIGS. 1 to 4, the first and second non-conductive material layers 410 and 420 are respectively disposed on the first and second band portions 1312 and 1322. On the contrary, in FIGS. 5 and 6, the first and second non-conductive material layers 410 and 420 may not only be respectively disposed on the first and second band portions 1312 and 1322, but also the first non-conductive material layer 410 may extend onto an edge between the first connection portion 1311 and the first band portion 1312, while the second non-conductive material layer 420 extends onto an edge between the second connection portion 1321 and the second band portion 1322.

The first and second non-conductive material layers 410 and 420 may be disposed on portions of the edges between the first and second connection portions 1311 and 1321 and between the first and second band portions 1312 and 1322 or on the whole edges between the first and second connection portions 1311 and 1321 and between the first and second band portions 1312 and 1322. For example, FIG. 1 shows that the first and second non-conductive material layers 410 and 420 are disposed on all four edges between the first and second connection portions 1311 and 1321 and the first and second band portions 1312 and 1322, but the first and second non-conductive material layers 410 and 420 may be disposed only on one, two, or three edges out of the four edges. For example, the first and second non-conductive material layers 410 and 420 may be respectively disposed on the edges where the first, second, fifth, or sixth surface of the capacitor body 110 meets the third surface and the fourth thereof.

The first and second non-conductive material layers 410 and 420 may not only be respectively disposed on the edges between the first and second connection portions 1311 and 1321 and the first and second band portions 1312 and 1322 but also respectively extend onto portions of the first and second connection portions 1311 and 1321.

For example, the first and second non-conductive material layers 410 and 420 may extend from upper portions of the first and second band portions 1312 and 1322 to partial upper portions of the first and second connection portions 1311 and 1321. Accordingly, the first and second non-conductive material layers 410 and 420 are disposed between the first and second external electrodes 131 and 132 and the first and second frame terminals 310 and 320.

The first and second non-conductive material layers 410 and 420 respectively extending to portions of the first and second connection portions 1311 and 1321 may be disposed on the upper, lower, left, or right sides of the first and second conductive bonding portions 510 and 520 or a combination thereof. Herein, the upper and lower sides of the first and second conductive bonding portions 510 and 520 may be defined upward and downward in the Z direction, and the left and right sides of the first and second conductive bonding portions 510 and 520 may be defined as both sides in the Y direction.

For example, when the first and second non-conductive material layers 410 and 420 are respectively disposed extensively from the first and second surfaces of the capacitor body 110 to the third and fourth surfaces thereof, the first and second non-conductive material layers 410 and 420 may be disposed on the upper and lower sides of the first and second conductive bonding portions 510 and 520, and when the first and second non-conductive material layers 410 and 420 are respectively disposed extensively from the fifth and sixth surfaces of the capacitor body 110 to the third and fourth surfaces thereof, the first and second non-conductive material layers 410 and 420 may be disposed on the right and left sides of the first and second conductive bonding portions 510 and 520.

Herein, a width of the first and second conductive bonding portions 510 and 520 may be narrower than that of the first and second connection portions 1311 and 1321, for example, the first and second conductive bonding portions 510 and 520 may respectively be disposed on a central area excluding the edges of the first and second connection portions 1311 and 1321.

Accordingly, when the first and second non-conductive material layers 410 and 420 are disposed on the edges where the first, second, fifth, and sixth surfaces of the capacitor body 110 meet with the third and fourth surfaces thereof, the first and second non-conductive material layers 410 and 420 extending to portions of the first and second connection portions 1311 and 1321 may respectively surround outer periphery portions of the first and second conductive bonding portions 510 and 520.

Herein, the first and second conductive bonding portions 510 and 520 are surrounded and isolated by the first and second non-conductive material layers 410 and 420 and thus may prevent a flux component from penetrating toward the first and second external electrodes 131 and 132 and the capacitor body 110 and thus suppress deterioration of an electronic component, generation of defects, and deterioration of reliability.

Figure 7:
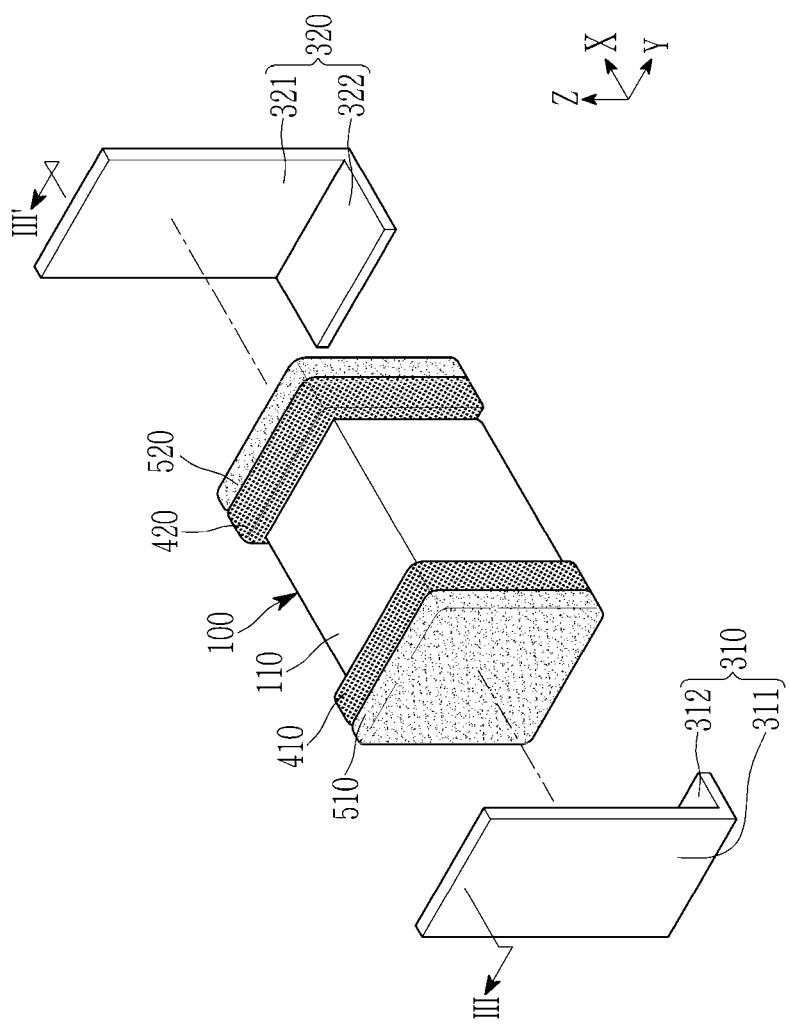
FIG. 7 is a partially exploded perspective view illustrating an electronic component according to another embodiment.
Figure 8:
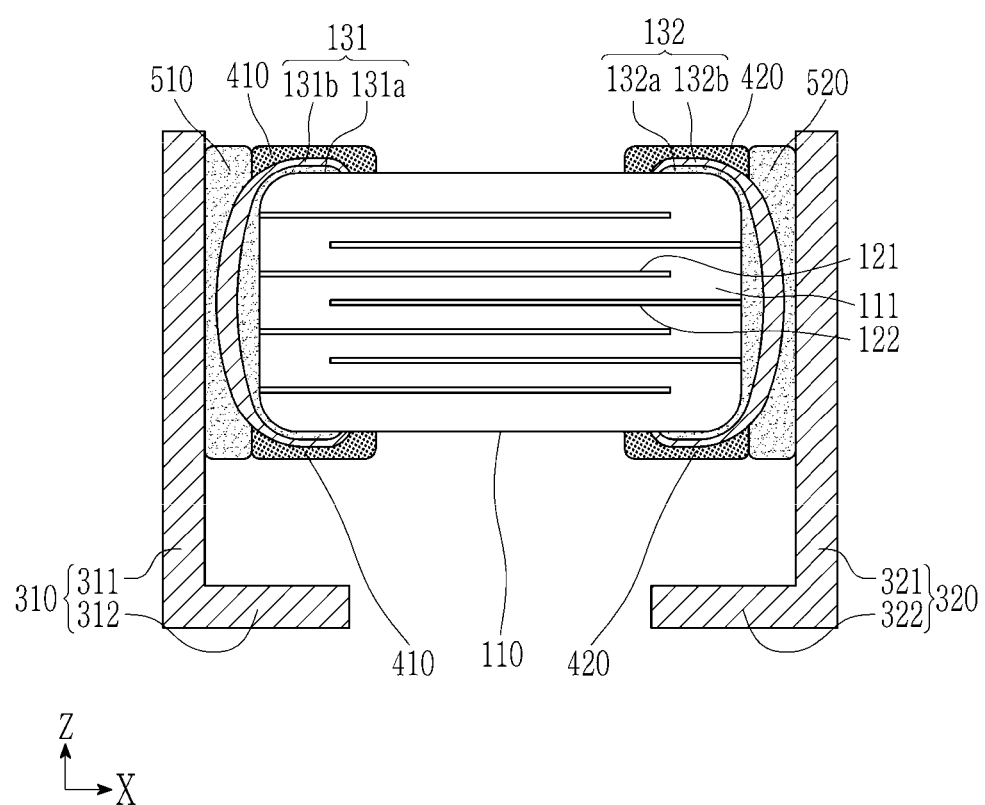
FIG. 8 is a cross-sectional view of the electronic component taken along line III-III' of FIG. 7.

FIG. 7 is a partially exploded perspective view illustrating an electronic component according to another embodiment, and FIG. 8 is a cross-sectional view of the electronic component taken along line III-III' of FIG. 7.

Since the electronic component according to the present embodiment is similar to the aforementioned electronic component, overlapping descriptions are omitted, and differences are mainly described.

In FIGS. 1 to 4, the first and second non-conductive material layers 410 and 420 are respectively disposed on the first and second band portions 1312 and 1322. On the contrary, in FIGS. 7 and 8, the first and second non-conductive material layers 410 and 420 are not only respectively disposed on the first and second band portions 1312 and 1322 but also respectively extend to portions of the first and second surfaces of the capacitor body 110.

For example, the first and second non-conductive material layers 410 and 420 may respectively extend from the tops of the first and second band portions 1312 and 1322 onto the portions of the first and second surfaces of the capacitor body 110. In addition, the first and second non-conductive material layers 410 and 420 may respectively extend from the tops of the first and second band portions 1312 and 1322 onto portions of the fifth and sixth surfaces of the capacitor body 110.

Herein, the first and second non-conductive material layers 410 and 420 may not cover the whole areas of the surfaces of the first and second band portions 1312 and 1322, and the first and second conductive bonding portions 510 and 520 may extend onto the portions of the surfaces of the first and second band portions 1312 and 1322.

An average thickness of the first and second non-conductive material layers 410 and 420 on the first and second band portions 1312 and 1322 may be thicker than that of the first and second conductive bonding portions 510 and 520 on the first and second band portions 1312 and 1322. Accordingly, the conductive bonding portions 510 and 520 may be effectively prevented from passing over the first and second non-conductive material layers 410 and 420 and penetrating toward the capacitor body 110. Herein, a thickness of the first and second non-conductive material layers 410 and 420 on the first and second band portions 1312 and 1322 is defined as a Z direction length, and a thickness of the first and second conductive bonding portions 510 and 520 on the first and second band portions 1312 and 1322 is a Z direction length. In addition, an average thickness of the first and second non-conductive material layers 410 and 420 may be, for example, obtained by measuring a thickness of the first and second non-conductive material layers 410 and 420 at random three, five, or ten points located at a predetermined interval along the Y direction and/or the Z direction and then arithmetically averaging them, and an average thickness of the first and second conductive bonding portions 510 and 520 may be for example, obtained by measuring a thickness of the first and second conductive bonding portions 510 and 520 at random three, five, or ten points located at a predetermined interval along the Y direction and/or the Z direction and then arithmetically averaging them. The thicknesses and widths disclosed herein may be measured by, for example, scanning electron microscopy. Other methods and/or tools appreciated by one of ordinary skill in the art, even if not described in the present disclosure, may also be used.

Figure 9:
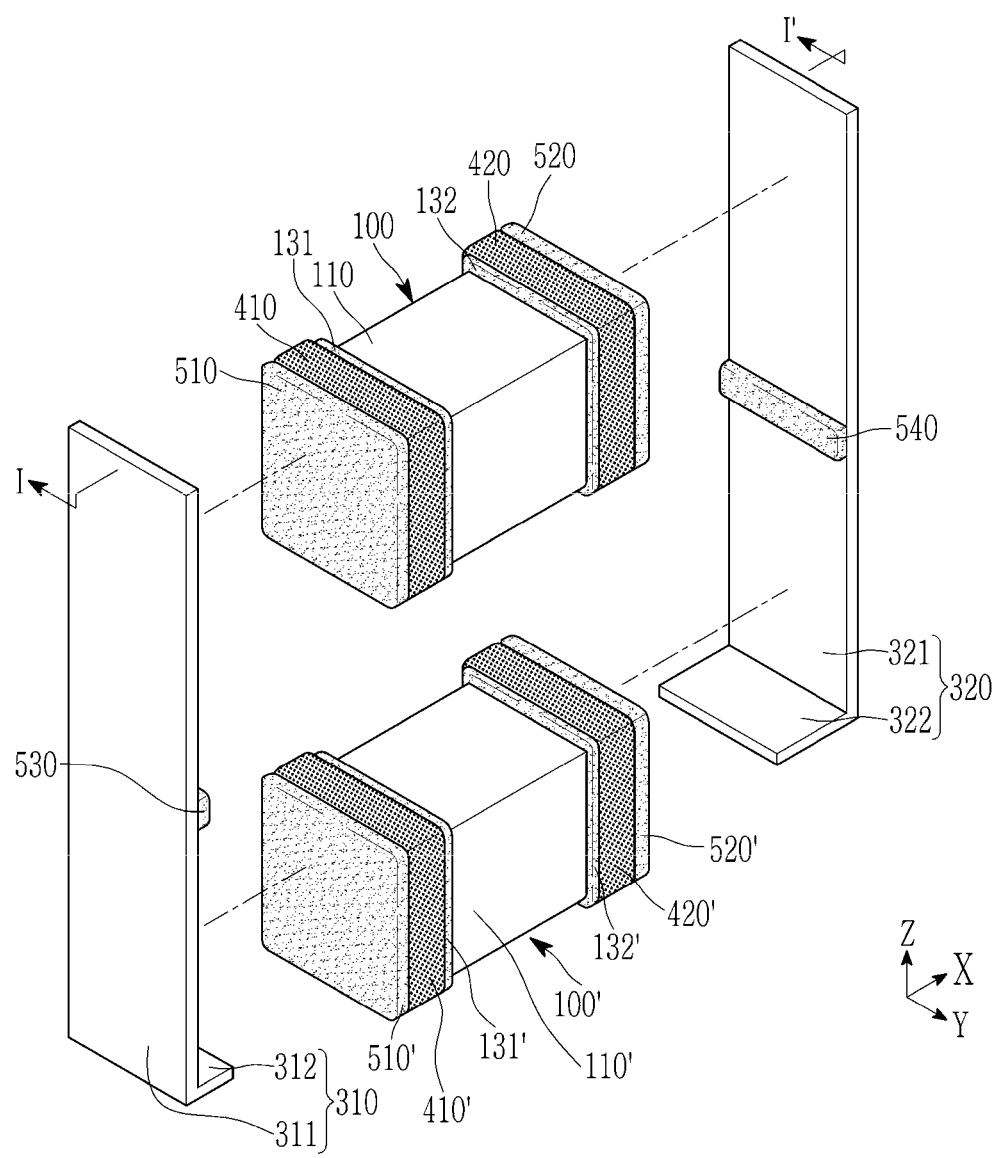
FIG. 9 is a partially exploded perspective view illustrating an electronic component according to another embodiment.
Figure 10:
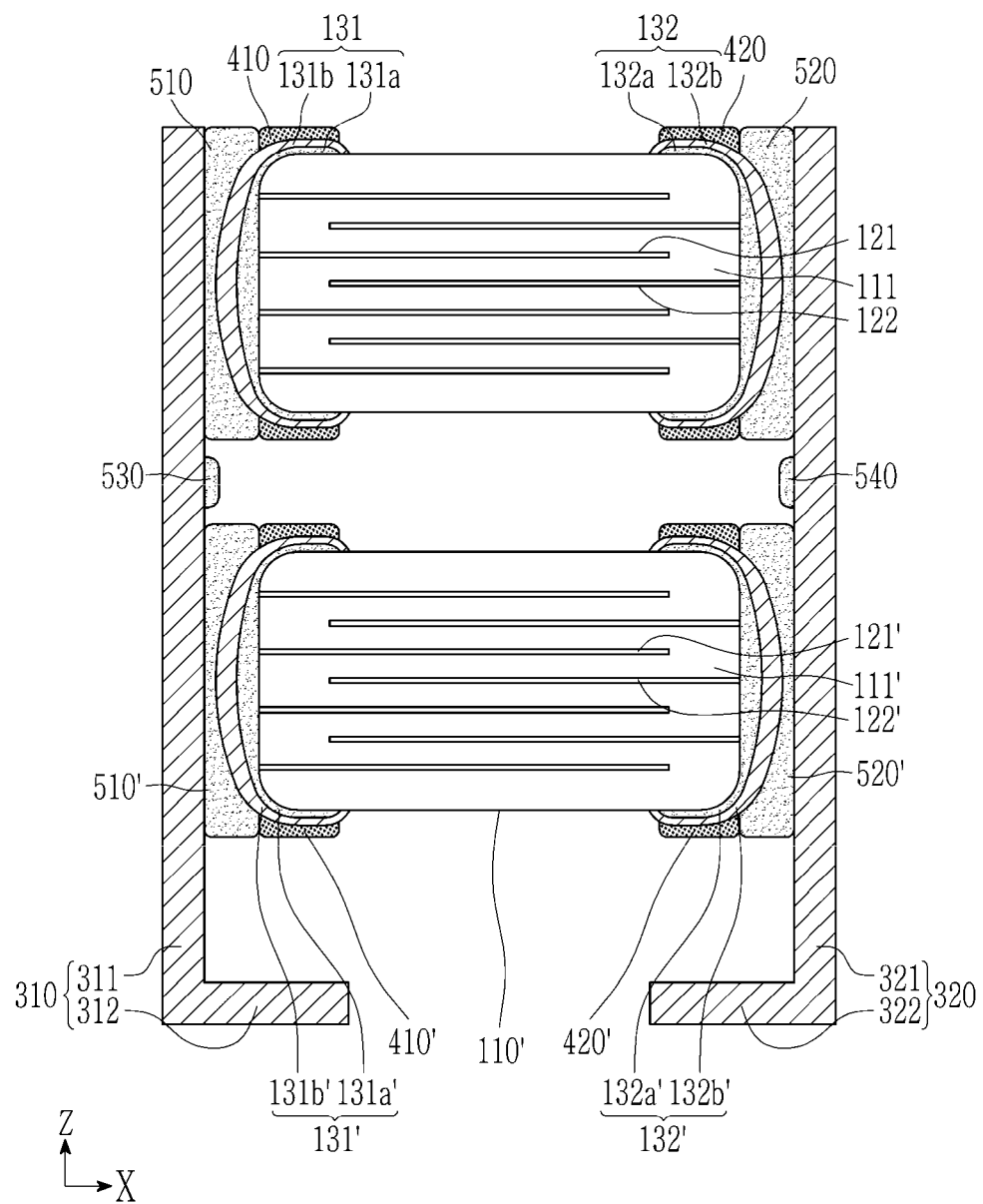
FIG. 10 is a cross-sectional view of the electronic component taken along line I-I' of FIG. 9.

FIG. 9 is a partially exploded perspective view illustrating an electronic component according to another embodiment, and FIG. 10 is a cross-sectional view of the electronic component taken along line I-I' of FIG. 9.

Since the electronic component according to the present embodiment is similar to the aforementioned electronic component, overlapping descriptions are omitted, and differences are mainly described.

FIGS. 1 and 2 illustrate a case in which one multilayer capacitor 100 is included, whereas FIGS. 9 and 10 illustrate a case in which a plurality of multilayer capacitors 100 and 100' are included.

For example, the first and second multilayer capacitors 100 and 100' may be arranged in the Z direction. In this case, the first surface of the first multilayer capacitor 100 and the second surface of the second multilayer capacitor 100' may be disposed to face each other.

Alternatively, the first and second multilayer capacitors 100 and 100' may be disposed in a row in the X direction or in parallel in the Y direction. In addition, three or more multilayer capacitors may be stacked in the Z direction.

The first multilayer capacitor 100 and the second multilayer capacitor 100' may be disposed at a predetermined interval. For example, the interval between the first multilayer capacitor 100 and the second multilayer capacitor 100' may be about 0.1 mm to about 1.0 mm in the Z direction.

The multilayer capacitor 100' disposed at the lowest layer may be disposed at a predetermined distance apart in the Z direction from the first and second mounting portions 312 and 322 of the first and second frame terminals 310 and 320.

The first and second multilayer capacitors 100 and 100' are disposed between the first and second frame terminals 310 and 320.

Accordingly, the electronic component includes a plurality of the first and second conductive bonding portions 510, 510', 520, and 520' respectively disposed between the first and second multilayer capacitors 100 and 100' and the first and second frame terminals 310 and 320.

The plurality of the first and second conductive bonding portions 510, 510', 520, and 520' may also be arranged in the Z direction at positions corresponding to the first and second multilayer capacitors 100 and 100' or disposed at regular intervals from one another.

The electronic component may include the first and second non-conductive material layers 410 and 420 respectively disposed on the first and second band portions 1312 and 1322. Alternatively, the electronic component may include the first and second non-conductive material layers 410 and 420 on the edges between the first and second connection portions 1311 and 1321 and the first and second band portions 1312 and 1322. In addition, the first and second non-conductive material layers 410 and 420 may respectively extend to portions of the first and second connection portions 1311 and 1321. Furthermore, the first and second non-conductive material layers 410 and 420 may extend to portions of the first and second surfaces of the capacitor body 110.

The electronic component may include a third non-conductive material layer 530 disposed between a plurality of the first conductive bonding portions 510 and 510'. Likewise, the electronic component may include a fourth non-conductive material layer 540 disposed between a plurality of the second conductive bonding portions 520 and 520'.

The third non-conductive material layer 530 may be disposed on the surface of the first frame terminal 310. Herein, the surface of the first frame terminal 310 on which the third non-conductive material layer 530 is disposed may face the first and second multilayer capacitors 100 and 100'. Likewise, the fourth non-conductive material layer 540 may be disposed on the surface of the second frame terminal 320. Herein, the surface of the second frame terminal 320 on which the fourth non-conductive material layer 540 is disposed may face the first and second multilayer capacitors 100 and 100'.

The third and fourth non-conductive material layers 530 and 540 may prevent a flux component generated from a conductive adhesive, when the first and second multilayer capacitors 100 and 100' are bonded to the first and second supporting portions 311 and 321, from penetrating into the multilayer capacitors 100 and 100' and thus deteriorating them. In addition, the first and second supporting portions 311 and 321 may be prevented from damage, and a solder may be prevented from flowing down, stably bonding the multilayer capacitors 100 and 100' onto the first and second supporting portions 311 and 321.

FIG. 11 is a view illustrating various shapes of a fourth non-conductive material layer 540. FIG. 11 is a view showing the second supporting portion 321 of FIG. 9 when viewed from the X direction. The third non-conductive material layer 530 may also have various shapes like the fourth non-conductive material layer 540 shown in FIG. 11.

Figure 11A:
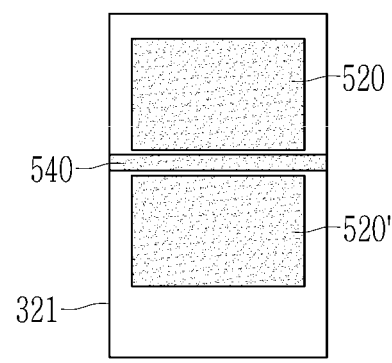
FIGS. 11A to 11F are each a view illustrating various shapes of a fourth non-conductive material layer.
Figure 11B:
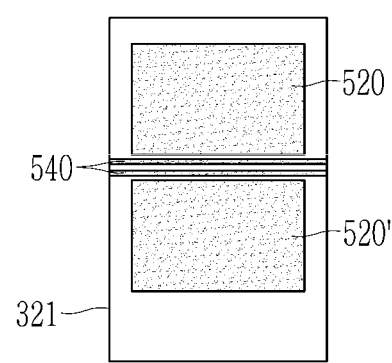
Figure 11C:
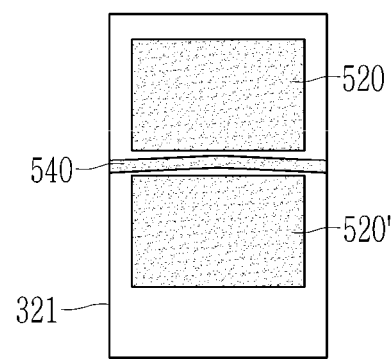
Figure 11D:
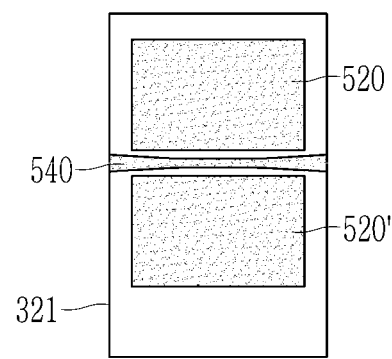
Figure 11E:
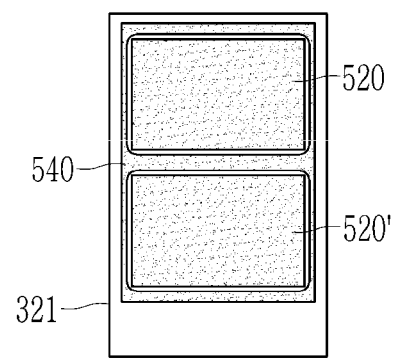
Figure 11F:
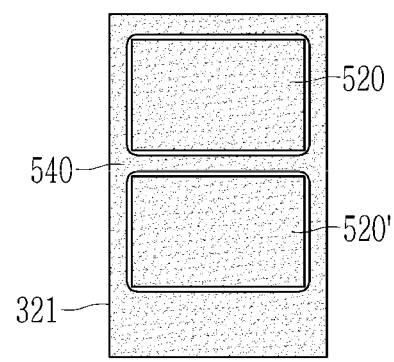

As shown in FIG. 11A, the fourth non-conductive material layer 540 may have a stripe shape crossing between the plurality of second conductive bonding portions 520 and 520'.

For example, an average width of the fourth non-conductive material layer 540 may be about 50 μm to about 500 μm, for example, about 50 μm to about 250 μm, or about 100 μm to about 200 μm. The average width of the fourth non-conductive material layer 540 may be about 2% to about 20% of the average thickness of the capacitor body 110 or 110', for example, about 2% to about 10% or about 4% to about 8% thereof or more than 2% to about 8% thereof. When the average width of the fourth non-conductive material layer 540 has a ratio of less than about 2%, a solder may be effectively prevented from flowing down, but when the ratio is greater than about 20%, conductivity between the capacitor body 110 and the second frame terminal 320 may be deteriorated.

Herein, a width of the fourth non-conductive material layer 540 indicates a Z direction length of the fourth non-conductive material layer 540, and a thickness of the capacitor bodies 110 and 110' indicates a Z direction length. In addition, the width of the fourth non-conductive material layer 540 may be, for example, obtained by measuring a thickness of the fourth non-conductive material layer 540 at random 3, 5, or 10 points located at a predetermined interval along the Y direction and then arithmetically averaging them, and an average thickness of the capacitor body 110 may be, for example, obtained by measuring a thickness of the capacitor body 110 at random 3, 5, or 10 points located at a predetermined interval along the Y direction and then arithmetically averaging them.

As shown in FIG. 11 B, the stripe shape of the fourth non-conductive material layer 540 may consist of a plurality of stripes.

As shown in FIG. 11 C, the fourth non-conductive material layer 540 may have a curved stripe shape inclined downward from a central portion toward both ends.

As shown in FIG. 11 D, the fourth non-conductive material layer 540 may have a concave stripe shape having a central portion with a narrow width but gradually becoming wider toward the both ends.

As shown in FIG. 11 E, the fourth non-conductive material layer 540 may extend to surround each outer periphery portion of the plurality of second conductive bonding portions 520 and 520'.

As shown in FIG. 11 F, the fourth non-conductive material layer 540 may extend to the whole surface facing the first and second multilayer capacitors 100 and 100' of the second frame terminal 320 excluding the plurality of second conductive bonding portions 520 and 520'.

Hereinafter, specific examples are presented. However, the examples described below are only for specifically illustrating or explaining the disclosure, and the scope of the disclosure is not limited thereto.

Experimental Example 1: Performance Test 1 of Electronic Components

Electronic components shown in FIGS. 1, 5, and 7 were respectively manufactured as electronic components according to Examples 1-1 to 1-3, and in FIG. 1, an electronic component in which the first and second non-conductive material layers were not disposed was manufactured as an electronic component according to Comparative Example 1-1.

The electronic components according to Examples 1-1 to 1-3 and Comparative Example 1-1 were tested with respect to moisture load resistance. Herein, a multilayer capacitor used in the examples and comparative example had a size of L*W*T=3.2*2.5*2.5, and the quantity was 271, respectively. A DC voltage, which is 120% of a rated voltage, was applied to a main body of the electronic components at an ambient temperature of 85° C. under humidity of 85%. After measuring initial insulation resistance before the test and then late IR after 2000 hours, a sample having log (initial IR/late IR)>0.3 was judged as NG, and the results are shown in Table 1.

TABLE 1

| | Comparative Example 1-1 | Example 1-1 | Example 1-2 | Example 1-3 |
|---|---|---|---|---|
| Occurrence number of IR deteriorations | 9 | 0 | 0 | 0 |
| Occurrence ratio of IR deteriorations (%) | 3.32 | 0 | 0 | 0 |

Referring to Table 1, in the electronic component according to Comparative Example 1-1, IR deterioration due to flux smearing was observed. On the contrary, the electronic components according to Examples 1-1 to 1-3 exhibited no IR deterioration below the reference value.

Experimental Example 2: Performance Test 2 of Electronic Components

As shown in FIG. 9, electronic components were manufactured by coating third and fourth non-conductive material layers on a frame terminal surface, but as shown in Table 2, the electronic components of Examples 2-1 to 2-4 were manufactured by adjusting a width (Z direction) of the non-conductive material layers. In FIG. 9, an electronic component in which the third and fourth non-conductive material layers were not formed on the frame terminal surface was manufactured as the electronic component of Comparative Example 2-1. In Table 2, an average width ratio (%) indicates a length ratio of an average width (Z direction) of the third and fourth non-conductive material layers relative to an average thickness (Z direction) of a capacitor body.

The electronic components according to Examples 2-1 to 2-4 and Comparative Example 2-1 were tested with respect to flux residues, moisture load resistance, and adhesion force, and the results are shown in Table 2. Herein, a multilayer capacitor used in the examples and the comparative example had a size of L*W*T=3.2*2.5*2.5 and the quantity was 10, respectively.

The presence of the flux residues was checked by observing a flux residue leaking between the multilayer capacitors stacked up and down through an optical microscope, wherein a sample showing that the flux residues leaked by more than ⅓ of the gap between the stacked multilayer capacitors was judged as NG.

The moisture load test was performed by applying a DC voltage, 120% of the rated voltage, to the multilayer capacitors at 85° C. under humidity of 85% to measure IR, wherein a sample showing that IR after 2000 hours was 30% or less of the initial IR was judged as NG.

The adhesion force test was performed by bonding each electronic component onto an alumina board through an SAC-based solder and applying a load to ½ of the L dimension of the electronic component in a perpendicular direction to the side thereof and then measuring a maximum load until the sample was dropped.

TABLE 2

| | Example 2-1 | Example 2-2 | Example 2-3 | Example 2-4 | Comparative Example 2-1 |
|---|---|---|---|---|---|
| Coating width (μm) | 50 | 100 | 200 | 500 | 0 |
| Average width ratio (%) | 2% | 4% | 8% | 20% | — |
| Flux residue | 1/10 | 0/10 | 0/10 | 0/10 | 10/10 |
| Occurrence number of IR deteriorations | 0/10 | 0/10 | 0/10 | 0/10 | 3/10 |
| Adhesion force (N) | 111 | 110 | 113 | 109 | 108 |

Referring to Table 2, the electronic component of Comparative Example 2-1 exhibited flux residues leaked between the multilayer capacitors disposed up and down and thus had deterioration of IR and adhesion force due to the flux spreading. On the contrary, the electronic components according to Examples 2-1 to 2-4 exhibited almost no flux residues leaked between the multilayer capacitors disposed up and down and thus no had deterioration of IR below the reference value and no deterioration of adhesion.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

What is claimed is:

1. An electronic component, comprising:
   a multilayer capacitor including
      a capacitor body including a dielectric layer and a plurality of first and second internal electrodes alternately disposed with the dielectric layer interposed therebetween, stacked in a stacking direction, and including first and second surfaces facing each other in the stacking direction, third and fourth surfaces connected to the first and second surfaces and facing each other, and one end of each of the first and second internal electrodes extends from the third and fourth surfaces, respectively, and
      an external electrode having a connection portion disposed on the third and fourth surfaces of the capacitor body to be connected to one of the first and second internal electrodes;
   a frame terminal disposed outside the connection portion;
   a conductive bonding portion disposed between the external electrode and the frame terminal;
   a band portion disposed to at least cover entirety of edges where the first and second surfaces and the third and fourth surfaces of the capacitor body meet; and
   a non-conductive material layer disposed to cover at least an entirety of a region of an outermost surface of the band portion disposed at the edges of the capacitor body where the first and second surfaces and the third and fourth surfaces meet, while exposing at least a portion of the first and second surfaces disposed between corresponding band portions.

2. The electronic component of claim 1, wherein the band portion extends from the connection portion to portions of the first and second surfaces of the capacitor body.

3. The electronic component of claim 1, wherein the non-conductive material layer extends onto an edge between the connection portion and the band portion.

4. The electronic component of claim 3, wherein the non-conductive material layer extends to a portion on the connection portion.

5. The electronic component of claim 4, wherein the non-conductive material layer is disposed on an upper, lower, left, or right side, or a combination thereof, of the conductive bonding portion.

6. The electronic component of claim 4, wherein the non-conductive material layer surrounds an outer periphery of the conductive bonding portion.

7. The electronic component of claim 4, wherein the conductive bonding portion is disposed in a central area excluding edges of the connection portion.

8. The electronic component of claim 1, wherein the non-conductive material layer extends to portions on the first and second surfaces of the capacitor body.

9. The electronic component of claim 1, wherein an average thickness of the non-conductive material layer disposed on the band portion is thicker than an average thickness of the conductive bonding portion disposed on the band portion.

10. The electronic component of claim 1, wherein the conductive bonding portion includes a solder or a conductive resin paste.

11. The electronic component of claim 1, wherein the non-conductive material layer includes a photo solder resist (PSR), an anti-flux diffusion inhibitor (anti-flux migration composition), polytetrafluoroethylene, borax ($Na_2[B_4O_5(OH)_4] \cdot 8H_2O$), or a combination thereof.

12. The electronic component of claim 11, wherein the non-conductive material layer further includes a metal powder including Cr, Ti, Ta, Mg, or a combination thereof.

13. The electronic component of claim 1, wherein the conductive bonding portion is disposed on an outermost surface of the connection portion.

14. The electronic component of claim 1, wherein the non-conductive material layer is disposed on an outermost surface of band portion.

15. An electronic component, comprising:
   first and second multilayer capacitors including
      a capacitor body including a dielectric layer and an internal electrode, and
      an external electrode having connection portions covering one surface of the capacitor body and a band portion covering an edge of the capacitor body;
   a frame terminal disposed outside the connection portions;
   conductive bonding portions disposed between the external electrodes and the frame terminal; and
   a first non-conductive material layer disposed to cover at least an entirety of a region of an outermost surface of the band portion,
   wherein the capacitor body includes a plurality of dielectric layers and a plurality of first and second internal electrodes alternately disposed with the dielectric layer interposed therebetween,
   the capacitor body includes first and second surfaces facing each other, third and fourth surfaces connected to the first and second surfaces and facing each other, and one end of each of the first and second internal electrodes extends from the third and fourth surfaces, respectively,
   the connection portion is respectively disposed on the third and fourth surfaces of the capacitor body to be connected to the first and second internal electrodes,
   the band portion is disposed at edges where the first and second surfaces and the third and fourth surfaces of the capacitor body meet, and
   the first non-conductive material layer is disposed on portions of the first and second surfaces that are covered by the band portion and exposes portions of the first and second surfaces that are not covered by the band portion.

16. The electronic component of claim 15, wherein the electronic component further includes a second non-conductive material layer disposed between the conductive bonding portions.

17. The electronic component of claim 16, wherein the second non-conductive material layer is disposed on a surface facing the multilayer capacitors of the frame terminal.

18. The electronic component of claim 16, wherein the second non-conductive material layer has a stripe shape crossing between the conductive bonding portions, a plurality of stripe shapes, a curved stripe shape inclined downward from a central portion toward both ends, or a concave stripe shape in which a center portion has a narrower width and a wider width toward end portions.

19. The electronic component of claim 16, wherein the second non-conductive material layer extends to surround an outer periphery portion of each of the conductive bonding portions.

20. The electronic component of claim 16, wherein the second non-conductive material layer extends to a whole surface of the frame terminal except for the conductive bonding portions.

21. The electronic component of claim 16, wherein an average width of the second non-conductive material layer is about 2% to about 20% relative to an average thickness of the capacitor body.

22. The electronic component of claim 16, wherein an average width of the second non-conductive material layer is more than 2% to about 20% relative to an average thickness of the capacitor body.

* * * * *